(No Model.)
R. S. KIRK.
CATTLE YOKE.
No. 600,950. Patented Mar. 22, 1898.
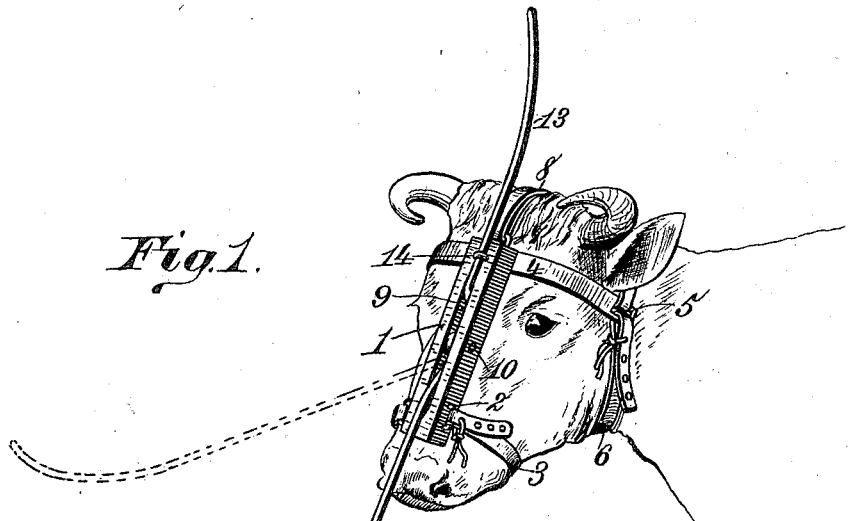
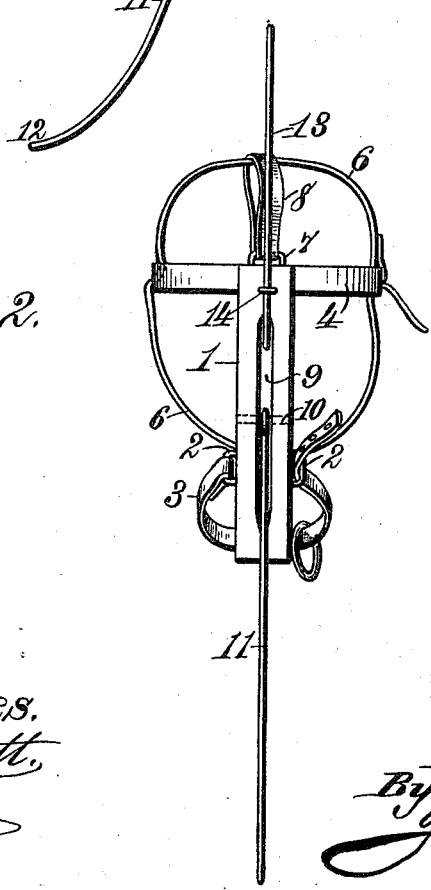
Witnesses.
Robert Garrett.
Inventor.
Robert S. Kirk.
By James L. Norris.
Atty.

UNITED STATES PATENT OFFICE.

ROBERT S. KIRK, OF DRESDEN, TEXAS.

CATTLE-YOKE.

SPECIFICATION forming part of Letters Patent No. 600,950, dated March 22, 1898.

Application filed October 11, 1897. Serial No. 654,916. (No model.)

*To all whom it may concern:*

Be it known that I, ROBERT S. KIRK, a citizen of the United States, residing at Dresden, in the county of Navarro and State of Texas, have invented a new and useful cattle-yoke for preventing them from breaking, tearing down, jumping over, or crawling through the openings in fences, of which the following is a specification.

My invention relates to improvements in cattle-yokes, and has for its object to provide a yoke of novel and simple construction and economical of manufacture which can be readily adjusted to the head of cattle and will effectually prevent the cattle from tearing down, forcing their way through, or jumping over fences without torturing or injuring the animal.

To this end the invention consists in a cattle-yoke of the novel construction, combination, and arrangement of parts hereinafter set forth, and pointed out in the claim, reference being made to the accompanying drawings, wherein—

Figure 1 is a perspective view of a cattle-yoke constructed in accordance with my invention and applied to the head of an animal and indicating by dotted lines the position of one member thereof when the animal is grazing. Fig. 2 is a front view of the yoke.

In the said drawings the reference-numeral 1 designates a face-piece which is preferably constructed of wood, though other material may be employed. This face-piece is adapted to lie along the bridge of the face of an animal, and at opposite sides, near its lower end, is provided with loops 2, to one of which one end of a strap 3 is secured, said strap being adapted to pass around the jaw of the animal and its free end to engage the other loop 2, whereby the lower end of the face-piece is adjusted to the head and upon the face of the animal. The free end of the strap may by any suitable fastening be secured to the loop 2.

Secured to the upper part of the face-piece 1 is a curved metallic strip 4, which conforms approximately in shape to the shape of the forehead of an animal and at its ends is provided with slots 5, through which is trained a strap 6, adapted to pass over the crown of the head of the animal and under its neck, whereby the upper part of the face-piece is held in proper position against the face of the animal. This strap at its free end may be suitably fastened to the strip 4.

The numeral 7 indicates a staple or loop secured in the top of the face-piece 1, and 8 indicates a leather loop passing through such staple or eye and embracing the strap 6, whereby said strap is prevented from slipping from its proper position when the yoke is adjusted upon the head of the animal.

The face-piece 1 is provided with a groove or recess 9 in its front part, and hung upon a pivot-pin 10, disposed in said recess or groove, so as to have free movement thereon, is a pivoted guard 11, constructed, preferably, of wire. The normal position of this guard is illustrated in full lines in Fig. 1 of the drawings, and this position it normally assumes by gravity when the yoke is adjusted. The lower extremity of this guard is curved forward, as at 12, so that should the animal lower its head until the guard meets the ground the point thereof will not enter the earth, whereby the liability of causing the animal to stumble, fall, or injure itself is avoided; but the curved portion will ride easily upon the surface of the ground. When the animal lowers its head for the purpose of grazing, the guard will turn upon its pivot-pin and its lower end will lift itself, as illustrated in the dotted lines, Fig. 1, thus leaving the animal perfectly free to graze.

The numeral 13 indicates an upper guard rigidly secured to the face-piece 1, as by means of a staple-rivet 14, and this guard is curved forward at its upper extremity. If desired, while the animal is grazing the lower pivoted guard may be swung up and temporarily held in such position by securing it to the upper rigid guard, as by means of a cord, in which position the guard will be entirely out of operative position and the animal perfectly free to graze or drink.

As hereinbefore stated, the normal position of the lower pivoted guard is that illustrated in full lines, Fig. 1, and this position it assumes by gravity when the animal is not grazing. Hence it is the position of the guard should the animal attempt to break through or jump over a fence. The upper and lower guards, as seen, project considerably above and below the head of the animal to such a degree that the animal cannot force its head through the palings of a wood fence or the adjacent strands of a wire fence. The lower guard also serves to prevent the animal jumping over the fence, as it cannot raise its head sufficiently high to clear the fence with the guard.

It will be seen that by my invention I provide a cattle-yoke which is of extremely simple construction and composed of few parts, so that it is very economical of manufacture, is easily adjusted to the face of an animal, and serves effectually to prevent it from tearing down, breaking through, or jumping over a fence and at the same time permits free grazing, and withal presents no element which could torture or injure or be harmful to the animal, an objection which exists to some cattle-yokes known prior to my invention.

Having thus described my invention, what I claim is—

The herein-described cattle-yoke adapted to be adjusted to the face of an animal and consisting of a face-piece 1, provided at its upper end with a curved metallic strip 4 and at its lower part with loops 2, adjusting-straps 3 and 6 connected with said face-piece and said curved metallic strip for securing the device to the face of an animal, a rigid guard 13 secured to said face-piece and projecting upwardly therefrom, and a lower guard 11 pivotally secured to and having free movement with respect to said face-piece, substantially as described.

ROBERT S. KIRK.

Witnesses:
H. W. DE VIES,
R. T. EMERSON.